US008950755B1

(12) United States Patent
Redfern et al.

(10) Patent No.: US 8,950,755 B1
(45) Date of Patent: Feb. 10, 2015

(54) WATERTIGHT CLOSURE GASKET INSERTION TOOL

(75) Inventors: Robert C. Redfern, Media, PA (US); Constantine V. Pappas, Upper Chichester, PA (US); Ronnie L. Ball, Turnersville, NJ (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 800 days.

(21) Appl. No.: 13/233,888

(22) Filed: Sep. 15, 2011

Related U.S. Application Data

(60) Provisional application No. 61/386,313, filed on Sep. 24, 2010.

(51) Int. Cl.
*F16J 15/02* (2006.01)
*B23P 19/04* (2006.01)

(52) U.S. Cl.
USPC .......... 277/644; 29/267

(58) Field of Classification Search
USPC .......... 254/21, 25, 131, 131.5; 29/244–282
See application file for complete search history.

(56) References Cited

U.S. PATENT DOCUMENTS

| | | | | | |
|---|---|---|---|---|---|
| 1,030,660 | A * | 6/1912 | Hunt | 254/131 |
| 3,939,973 | A * | 2/1976 | Wallestad | 206/711 |
| 4,433,462 | A * | 2/1984 | Stratton | 29/229 |
| 4,768,271 | A * | 9/1988 | Jacob et al. | 29/267 |
| 5,553,871 | A | 9/1996 | Rowe et al. | |
| D428,783 | S * | 8/2000 | Precetti et al. | D8/40 |
| 6,578,223 | B1 * | 6/2003 | Link et al. | 7/156 |
| 6,799,396 | B1 | 10/2004 | Redfern et al. | |
| 6,879,256 | B1 | 4/2005 | Redfern et al. | |
| 7,108,021 | B2 * | 9/2006 | Lile et al. | 140/117 |
| 7,152,375 | B1 | 12/2006 | Mastro et al. | |
| 7,451,714 | B1 | 11/2008 | Redfern et al. | |
| 8,713,773 | B2 * | 5/2014 | Foxx et al. | 29/270 |
| 2010/0187768 | A1 * | 7/2010 | Sedlar et al. | 277/561 |

* cited by examiner

*Primary Examiner* — Lee D Wilson
*Assistant Examiner* — Seahee Yoon
(74) *Attorney, Agent, or Firm* — Howard Kaiser

(57) ABSTRACT

A handheld tool is for facilitating installation of a resilient, elongate, generally rectangle-profiled gasket designed to tightly fit inside and along the partially obstructed perimetric channel of a watertight doorway onboard a marine vessel. As typically embodied, the inventive tool includes a straight handle (e.g., shaft or rod) and a head. The head includes a right-triangle profiled section and an L-shape-profiled section. The handle is perpendicularly connected to the hypotenuse surface of the right-triangle profiled section. The L-shape-profiled section has two interior surfaces forming an interior right angle that faces away from the hypotenuse surface. The bisector of the interior right angle is parallel to the handle and perpendicular to the hypotenuse surface. A user holds the inventive tool by the handle, controls the gasket so that a rectangular corner portion of the gasket fits inside the L-shape-profiled section's interior right angle, and forcefully manipulates the gasket into the channel.

20 Claims, 9 Drawing Sheets

PRIOR ART

WATERTIGHT CLOSURE GASKET INSERTION TOOL

BACKGROUND OF THE INVENTION

The present invention relates to gaskets for effecting watertight sealing of doors and other closures, more particularly to methods and devices for installing such gaskets in such closures.

The United States Navy's surface ship fleet includes about about eighty thousand watertight closures such as doors, hatches, and scuttles. A common feature of shipboard watertight closures is an elastic (e.g., elastomeric) sealing body known as a "gasket." The most prevalent watertight closure gasket in the U.S. Navy's fleet is an embodiment of the "Fluidtight Door Gasket" disclosed by Marline D. Rowe and Francis A. McMullin at U.S. Pat. No. 5,553,871, issue date 10 Sep. 1996, incorporated herein by reference. The gasket disclosed by Rowe and McMullin is typically embodied as being characterized along its length by two forty-five degree chamfers and a medial semicircular groove therebetween.

The Rowe-McMullin gasket and the vast majority of other gaskets are described herein as having a "generally rectangular" cross-section. The term "generally rectangular," as used herein to describe the cross-sectional shape of a gasket or of a gasket channel, is intended herein to convey a rectangular form that is either a perfect rectangle or a quasi-rectangle, the latter being a rectangular form that departs from perfect geometric rectangularity in certain geometric respects. Historically speaking, most watertight closure gaskets, and most watertight closure channels to which they correspond, have been characterized by a three-dimensional shape that "generally" defines a rectangular prism or a rectangular parallelepiped. "Generally" conveys that a gasket or a gasket channel may be characterized by certain design geometric deviations from a pure rectangular prismatic geometry or pure rectangular parallelepiped geometry.

The Rowe-McMullin gasket embodiment in current Navy use, illustrated in FIG. 1 and FIG. 2, is made of a Commercial Item Description A-A-59588 silicone rubber, grade 3B, class 30 composite, which is about a 30 durometer material. In terms of ease of installation, this silicone rubber material is superior to Mil-R-900 rubber (about 50 durometers), which used to be the Navy's material of choice for constituting watertight closure gaskets.

Generally speaking, the lower the durometer, the more pliable the material, and hence the easier it is for personnel to manipulate a gasket while installing it into a closure gasket channel. Nevertheless, installation of even a relatively pliable gasket requires strong hands and strong fingers to work the gasket into the entire channel perimeter; for instance, approximately seventeen linear feet of gasket is required for a typical watertight door onboard a Navy ship.

Personnel installing a gasket tend to longitudinally stretch (lengthen) the gasket, largely inadvertently, before and during insertion of the gasket into the channel. Lengthwise stretching of a gasket decreases the width of the gasket, thus making the gasket easier to install. Unfortunately, after the installation is complete, the gasket tends to relax back (shorten) to its original, pre-stretched length. This relaxation of the elastic gasket material often creates a gap between the two butt ends of the gasket, the watertight closure thereby being rendered "non-watertight." The resultant defective gasket needs to be replaced, not due to any obvious material defect, but solely due to the gap between the two gasket ends. This gasket replacement cycle may repeat itself again and again.

The Navy's gasket is usually supplied on spools by vendors, each spool carrying a specific length (e.g., 160 feet) of the gasket. The Navy purchases enough gasket material through the stock system alone to replace every gasket on every watertight door on an annual basis. At about $3.50 per foot, this amounts to about $2,500,000 spent annually by the Navy for gasket material replacement, which is cost in addition to the time required by personnel to remove and install the gaskets.

The main reason for such high usage of the Navy's gasket is not ripping, tearing, or "permanent set" of the gasket, but rather is the elasticity of the gasket—in particular, the propensity of the gasket material to be stretched before and during installation, and to then relax back to its previous, installed length over a period of time, thereby creating a gap between the two gasket ends.

SUMMARY OF THE INVENTION

In view of the foregoing, it is an object of the present invention to provide method and apparatus for installing a gasket that is designed to be fit inside a channel included in or associated with a closure (such as may exist onboard a ship) so that the gasket imparts watertightness to the closure.

A further object of the present invention is to provide such method and apparatus that are facilitative of gasket installation.

Another object of the present invention is to provide such method and apparatus that, as compared with conventional approaches to gasket installation, reduce or minimize length-increasing elastic deformation of a gasket during gasket installation.

A typical embodiment of a gasket insertion device in accordance with the present invention includes a head and a handle. The head includes a right-trianguloid-profiled section and an L-profiled section. The right-trianguloid-profiled section has a hypotenuse surface. The handle is characterized by a geometric handle axis and is connected to the head at the hypotenuse surface. The handle axis is approximately perpendicular to the hypotenuse surface. The L-profiled section has a first interior surface and a second interior surface. A geometric first right angle is formed by the first interior surface and the second interior surface, and is characterized by a geometric first right angle bisector. The first bisector is approximately parallel to the handle axis and approximately perpendicular to the hypotenuse surface.

According to frequent inventive practice, the trianguloid-profiled section has, in addition to the hypotenuse surface, a first non-hypotenuse surface and a second non-hypotenuse surface. The L-profiled section has, in addition to the first interior surface and the second interior surface, a first exterior surface and a second exterior surface. A geometric second right angle is formed by the first exterior surface and the first non-hypotenuse surface, and is characterized by a geometric second right angle bisector, which is approximately perpendicular to the handle axis, approximately perpendicular to the first bisector, and approximately parallel to the hypotenuse surface. A geometric third right angle is formed by the second exterior surface and the second non-hypotenuse surface, and is characterized by a geometric third right angle bisector, which is approximately perpendicular to the handle axis, approximately perpendicular to the first bisector, approximately parallel to the hypotenuse surface, and approximately parallel to the second bisector.

The present invention's gasket insertion device, as typically embodied, is a handheld tool that enables personnel to insert gasket material into a watertight closure gasket channel without stretching the gasket. Elegant in its design and economical to fabricate, the inventive device eliminates the need for manual "muscling" of the gasket into the channel along the length of the channel, a forceful and labor-intensive activity that represents the primary causation for stretching of the gasket. The inventive device reduces the time required, and makes it easier, for personnel to install a gasket.

The cost-savings afforded by inventive practice can be significant, especially because of its mitigation or elimination of the gasket-stretching factor. For instance, inventive practice could save the Navy over a million dollars annually because of the alleviated need to procure and replenish gaskets for watertight closures. Moreover, fabrication of most embodiments of the present invention should be neither unduly difficult nor unduly expensive.

BRIEF DESCRIPTION OF THE DRAWINGS

In order that the present invention may be clearly understood, it will now be described, by way of example, with reference to the accompanying drawings, wherein:

As shown in FIG. 3, the installed gasket's longitudinal ends meet each other. The installed gasket is elongated due to stretching associated with its installation.

As shown in FIG. 4, the installed gasket's longitudinal ends do not meet each other. The installed gasket has elastically relaxed to its original length, thereby leaving a gap between the gasket's longitudinal ends.

FIG. 7 is a top longitudinal view of the inventive embodiment shown in

FIG. 5.

FIG. 9 illustrates insertion, using the inventive embodiment shown in FIG. 5, of a gasket into a gasket channel.

FIG. 10 further illustrates insertion, using the inventive embodiment shown in FIG. 5, of a gasket into a gasket channel.

FIG. 13 illustrates insertion, using the inventive embodiment shown in FIG. 12, of a gasket into a gasket channel.

DETAILED DESCRIPTION OF THE INVENTION

Figure 1:
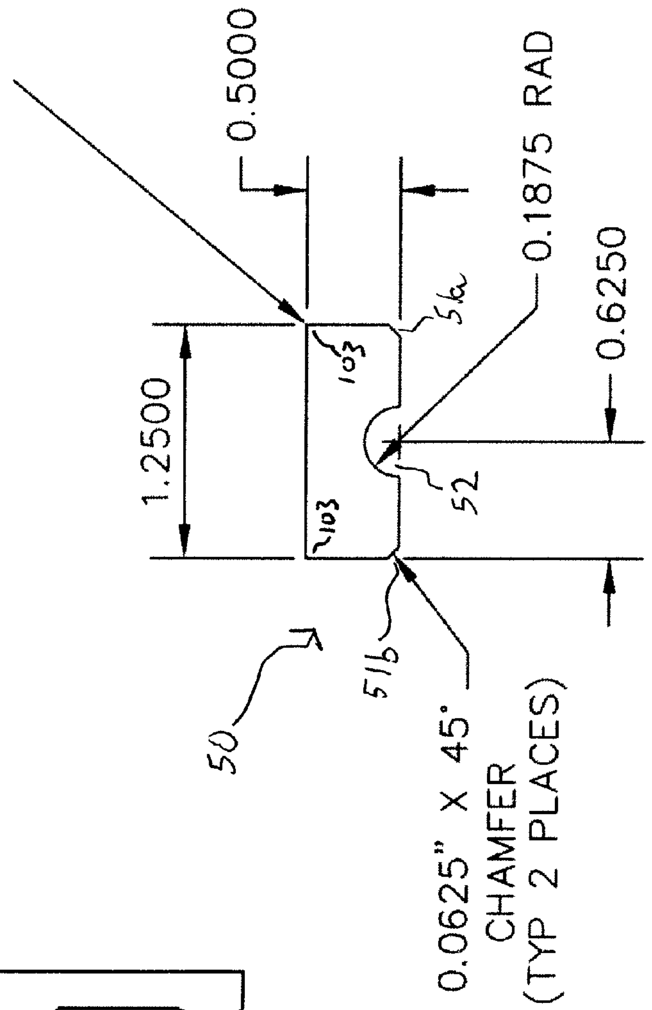
FIG. 1 PRIOR ART
FIG. 1 is a cross-sectional view (or profile view) of the Rowe-McMullin gasket embodiment currently in use by the U.S. Navy.
Figure 2:
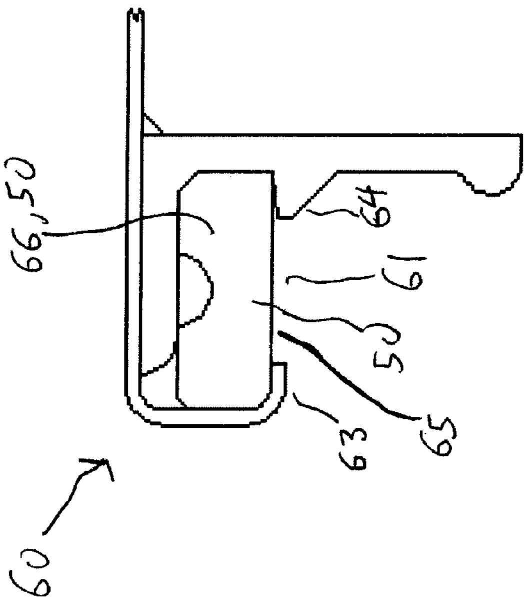
FIG. 2 PRIOR ART
FIG. 2 is a view, similar to the FIG. 1 view of the Rowe-McMullin gasket, showing by way of example the Row-McMullin gasket installed in the gasket channel of a watertight closure onboard a ship.

Referring now to FIG. 1 and FIG. 2, Rowe-McMullin gasket 50 is characterized by a generally rectangular cross-section, two forty-five degree chamfers 51*a* and 51*b*, and a medial semicircular groove 52. Gasket 50 is a resilient body and is shaped and dimensioned compatibly with perimetric channel 61 of doorway 60, thus permitting insertion of gasket 50 into channel 61 and tight situation therein. Installation of gasket 50 into a watertight closure channel such as channel 61 of doorway 60 has traditionally been accomplished through use of an installer's fingers to grasp and press gasket 50 along its length until completely situate inside channel 61.

Figure 4:
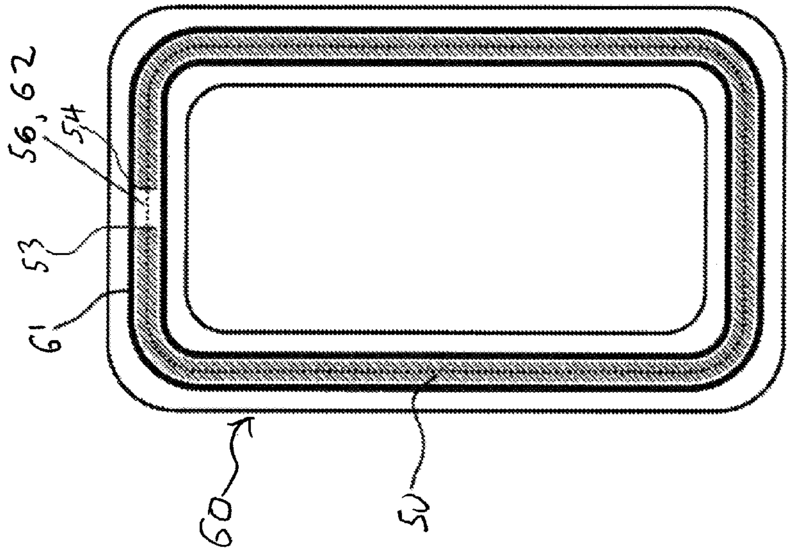
FIG. 4 PRIOR ART
FIG. 4 is a diagrammatic elevation view, similar to FIG. 3, of the same shipboard watertight door with the same gasket installed in the door's perimetric channel.
Figure 3:
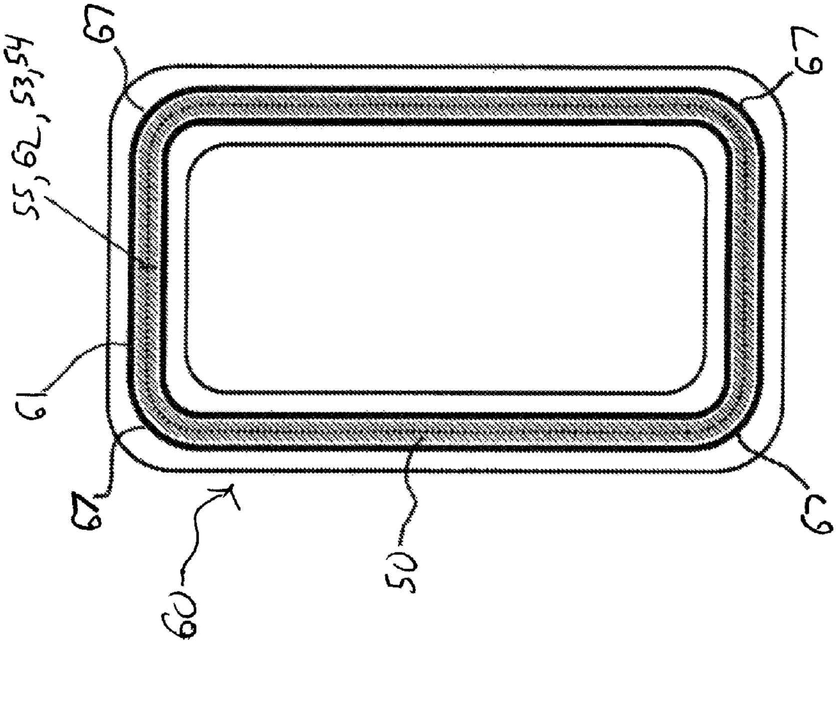
FIG. 3 is a diagrammatic elevation view of a shipboard watertight door with a gasket installed in the door's perimetric channel.

With reference to FIG. 3 and FIG. 4, the person or persons who install a gasket need to know approximately how much gasket 50 is needed to go around the perimeter of the closure 60. The installer "unwraps" the gasket 50 from a spool, and then makes a ninety-degree cut across the gasket 50. The gasket 50 installation process, such as with respect to a door 60 as shown in FIG. 3 and FIG. 4, starts at the top dead-center location 62 of the door 60's perimetric gasket channel 61. Installation of gasket 50 proceeds from starting location 62 all the way around the perimetric channel 61 in either a clockwise or counterclockwise direction, until returning to the starting location 62, where the two ends 53 and 54 of gasket 50 nearly or imperfectly meet. At this point the installer makes another cut (a square cut) of the gasket 50, the proper performance of which creates at location 62 a square butt joint 55 of the ends 53 and 54 of installed gasket 50. The installer is careful to cut the gasket in a most suitable place to ensure that the resultant joint is a tight square butt joint of the two gasket 50 ends 53 and 54, which meet each other at starting location 62.

A problem arises over time after installation because the installer tends to stretch the elastic gasket 50, especially in the lengthwise direction, during installation. As shown in FIG. 2, channel 61 has two protrusions (projections) 63 and 64, which reduce the width of the opening 65 of channel 61, as compared with the width of the interior 66 of channel 61. Stretching the gasket 50 lengthwise decreases the width of gasket 50, thus easing the pushing of gasket 50 past protrusions 63 and 64 until gasket 50 fits snugly within the interior 66 of channel 61. However, subsequent to the installation, the gasket tends to "unstretch," that is, shorten so as to return to its original length. The result of this relaxation of elastic gasket 50 is gap 56 in the area of starting location 62. Gap 66, the separation between the two butt ends 53 and 54 of gasket 50, compromises the watertightness of closure 60. Gasket 50 therefore is defective and requires replacement.

Reference now being made to FIG. 5 through FIG. 11, the present invention is typically embodied as a device suitable for facilitating installation of a gasket (such as gasket 50) into a watertight closure channel (such as channel 61 of door 60). This example of a gasket insertion device 100 in accordance with the present invention includes a straight handle (e.g., a rod or a shaft) 200 and a specially shaped head 300. Generally, the linear dimensions indicated in the drawings are expressed in inches.

Figure 5:
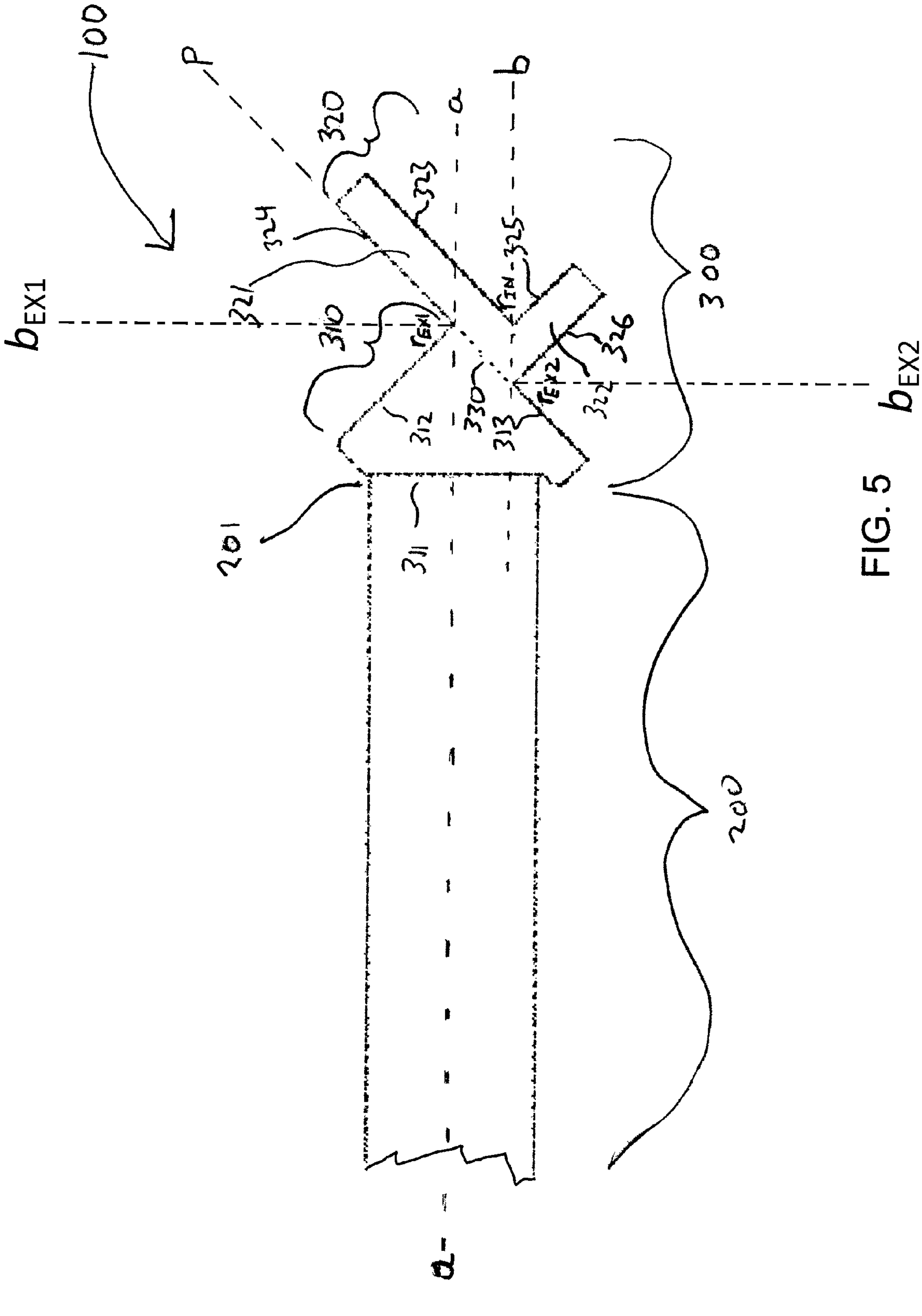
FIG. 5 is partial side longitudinal view of an embodiment of a gasket installation device in accordance with the present invention.
Figure 6:
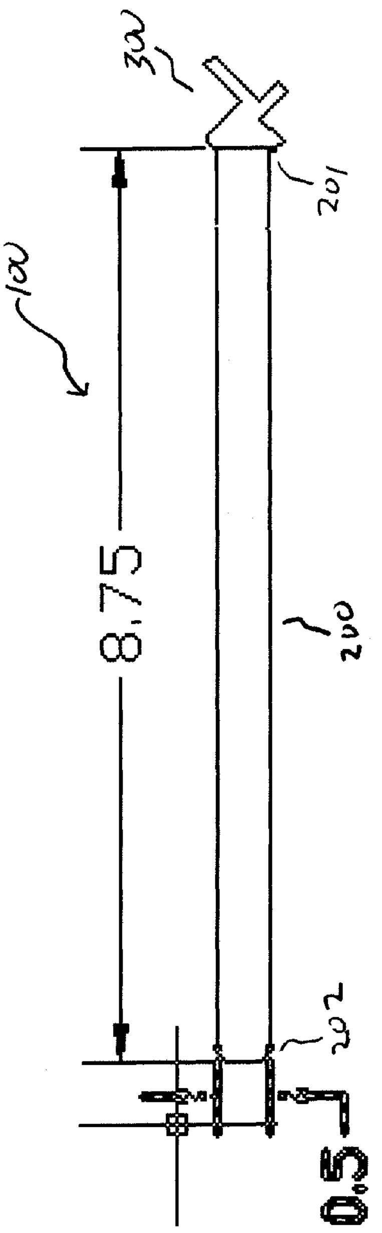
FIG. 6 is complete and smaller rendition of the view of the inventive embodiment shown in FIG. 5.
Figure 7:
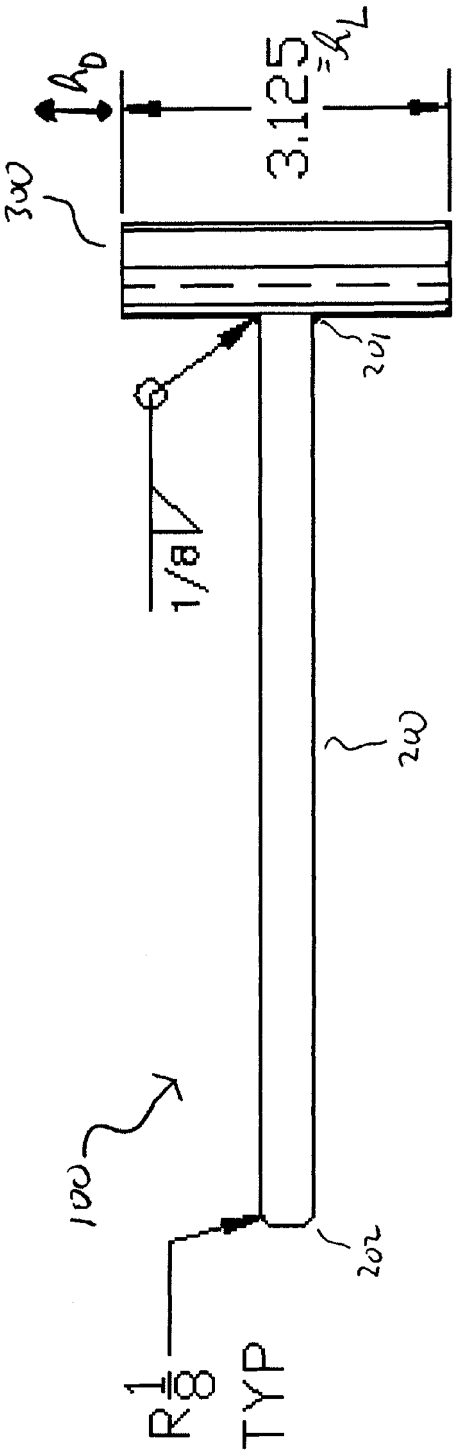
Figure 8:
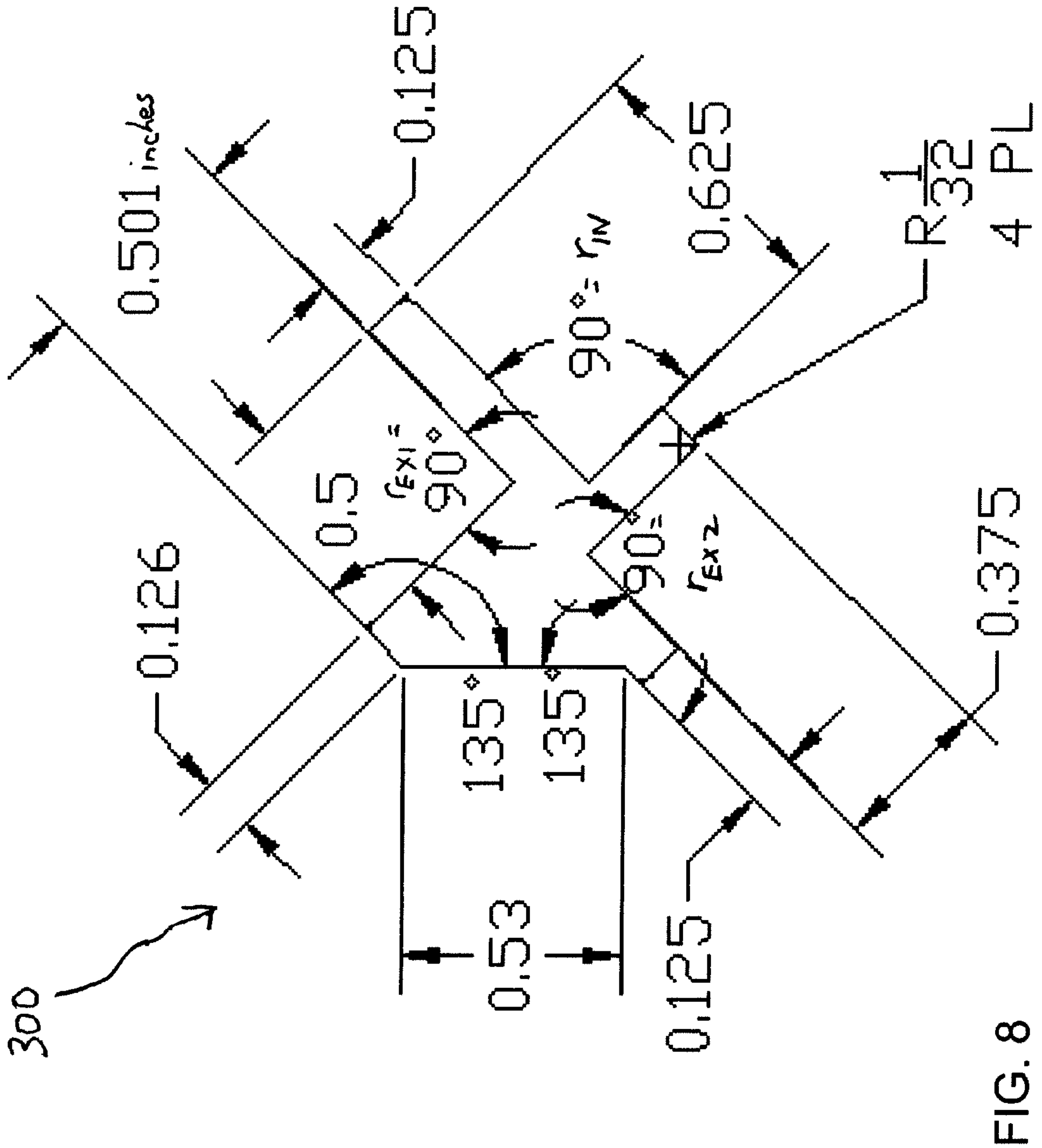
FIG. 8 is a view, of the head component of the inventive embodiment shown in FIG. 5, that is similar to the views of FIG. 5 and FIG. 6 and that includes dimensional and angular information.

Handle 200 has a geometric longitudinal axis a, an attached end 201, and an unattached end 202. Head 300 includes a trianguloid-profiled prismatic section 310 and an L-profiled prismatic section 320. Trianguloid-profiled prismatic section 310 has a longitudinal planar attachment surface 311, a longitudinal planar first non-attachment surface 312, and a longitudinal planar second non-attachment surface 313. Handle 200 is attached at its end 201 to trianguloid-profiled prismatic section 310 at the center of, and with its axis a perpendicular to, longitudinal attachment surface 311. L-profiled prismatic section 320 includes two generally planar segments, viz., a first generally planar segment 321 and a second generally planar segment 322. First generally planar segment 321 is significantly longer than (as shown in FIG. 5 and other figures, roughly twice as long as) second generally planar segment 322. Trianguloid-profiled prismatic section 310 and L-profiled prismatic section 320 are characterized by the same longitudinal expanse $h_L$, and are joined along the same prismatic longitudinal direction $h_D$.

First generally planar segment 321 has a longitudinal planar first L-interior segment surface 323 and a longitudinal planar first L-exterior segment surface 324. Second generally planar segment 322 has a longitudinal planar second L-interior segment planar surface 325 and a longitudinal planar second L-exterior segment planar surface 326. First L-interior segment surface 323 and second L-interior segment surface 325 form an L-interior right angle $r_{IN}$ that faces generally opposite the attachment surface 311 and whose geometric bisector b is approximately parallel to the handle 200 axis a and approximately perpendicular to attachment surface 311. First non-attachment surface 312 and first L-exterior segment surface 324 form a first L-exterior right angle $r_{EX1}$, which has geometric bisector $b_{EX1}$. Second non-attachment surface 313 and second L-exterior segment surface 326 form a second L-exterior right angle $r_{EX2}$, which has geometric bisector $b_{EX2}$. Geometric bisector $b_{EX1}$ is approximately perpendicular to handle axis a, approximately perpendicular to geometric bisector b, and approximately parallel to attachment surface 311. Geometric bisector $b_{EX2}$ is approximately perpendicular to handle axis a, approximately perpendicular to geometric bisector b, approximately parallel to attachment surface 311, and approximately parallel to geometric bisector $b_{EX1}$.

According to frequent practice and as exemplified by this inventive embodiment, second non-attachment surface 313 and first L-exterior segment surface 324 face in generally opposite directions and are approximately coplanar, each of the two surfaces lying in geometric plane p. Trianguloid-profiled prismatic section 310 and L-profiled prismatic section 320 hence are coupled, or can be conceived to be coupled, along a planar joint 330 (shown by dashed line segment in FIG. 5), which also lies in geometric plane p. The two main components of head 300, viz., trianguloid-profiled prismatic section 310 and L-profiled prismatic section 320, are thus propitiously united so that manipulative force can be brought to bear upon L-profiled prismatic section 320 via humanly grasped handle 200. Trianguloid-profiled prismatic section 310 serves to orient L-profiled prismatic section 320 (especially, L-interior right angle $r_{IN}$), and to bear much of the load during operation of inventive insertion device 100.

The inventive device 100 embodiment shown in FIG. 5 through FIG. 11 has a quality of geometric elegance in various ways, among which are discussed hereinabove. Note further, as shown in FIG. 5, that handle axis a passes through the linear vertex of first L-exterior right angle $r_{EX1}$. Moreover, the linear vertex of second L-exterior right angle $r_{EX2}$ lies in geometric bisector plane b of L-interior right angle $r_{IN}$. The linear vertex of first L-exterior right angle $r_{EX1}$ and the linear vertex of second L-exterior right angle $r_{EX2}$ represent line segments that are coextensive and that lie in the same geometric plane, viz., bisector plane b, which is parallel to handle axis a.

Figure 9:
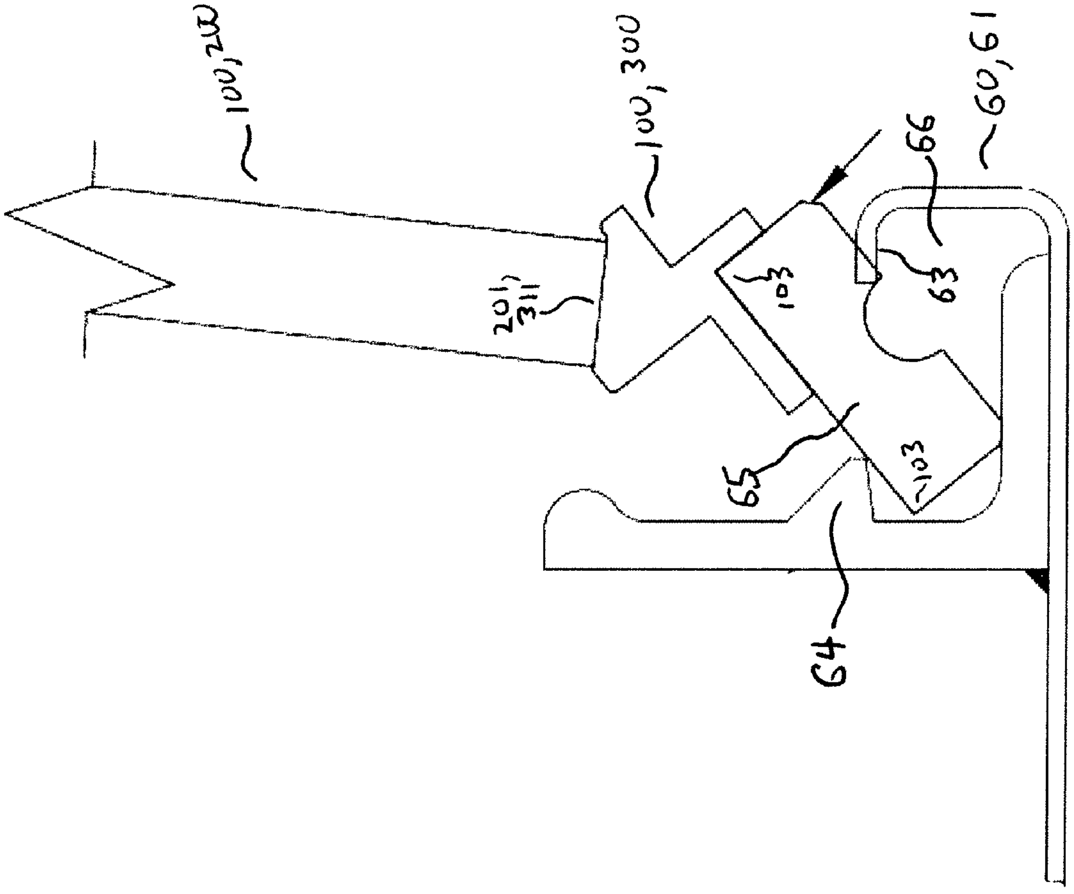
FIG. 9 is a partial side longitudinal view of the inventive embodiment shown in FIG. 5 and of a gasket channel of a watertight closure such as shown in FIG. 2.
Figure 10:
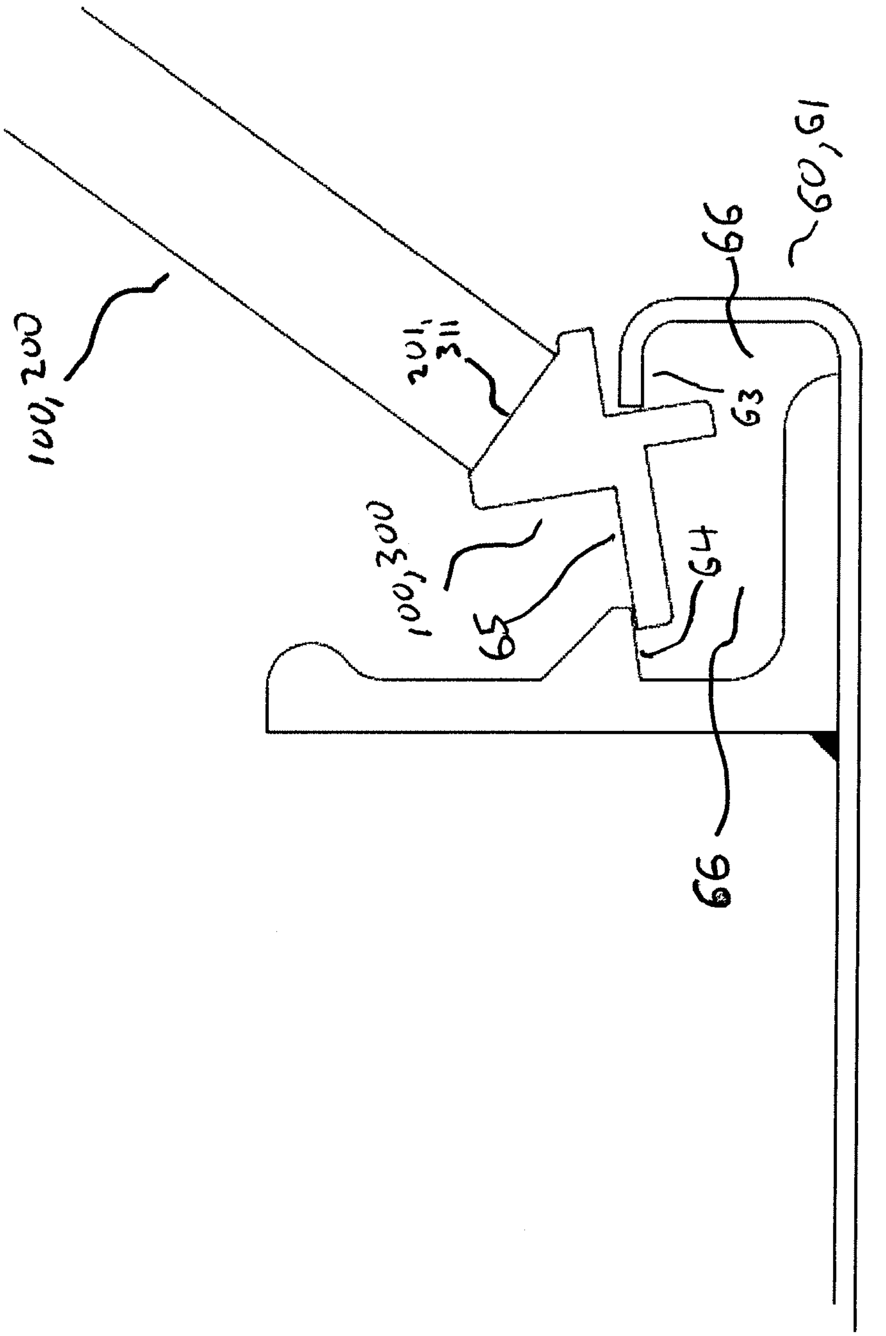
FIG. 10 is a view, similar to the FIG. 9 view, of the inventive embodiment shown in FIG. 5 and of a gasket channel such as shown in FIG. 2.
Figure 11:
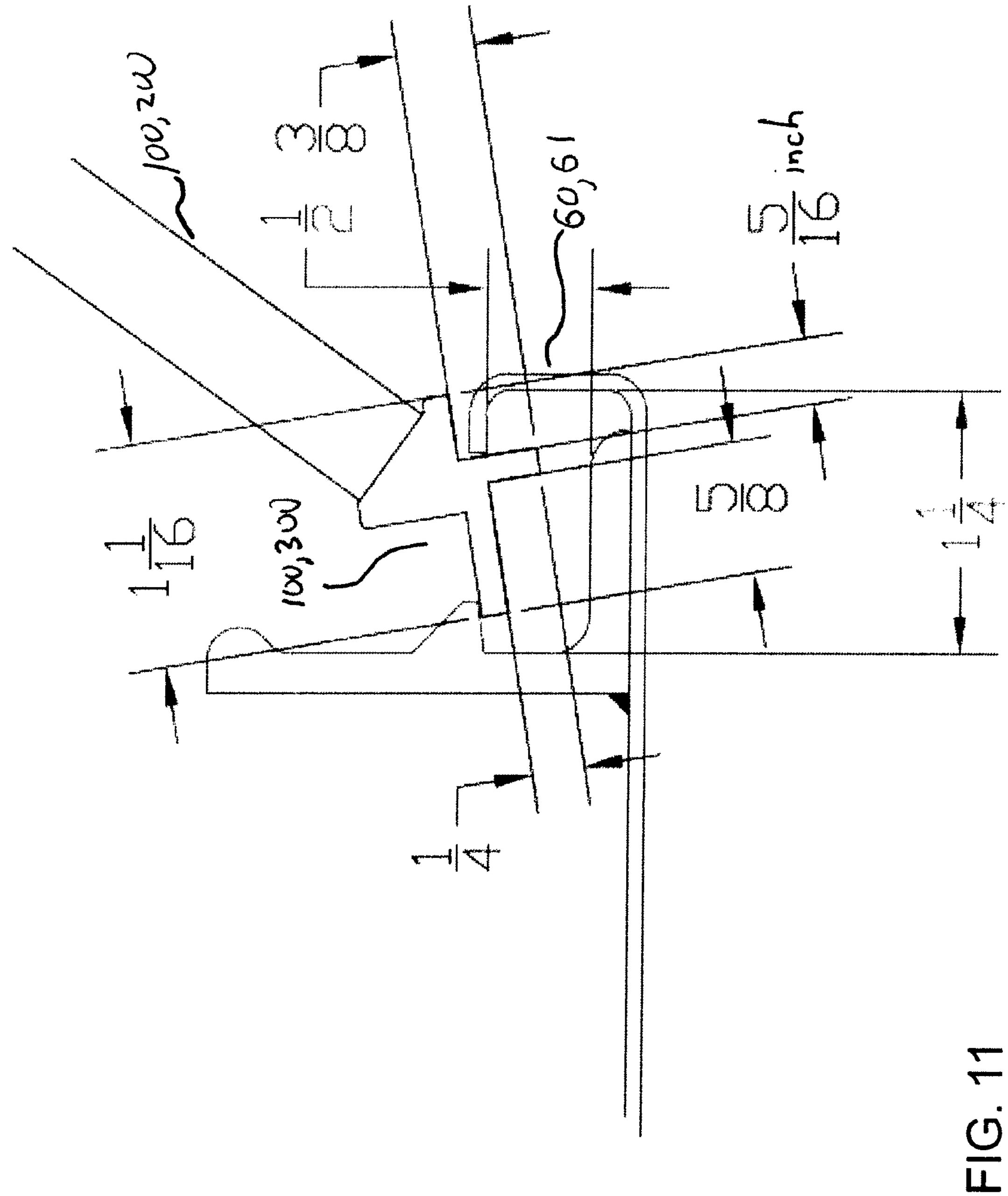
FIG. 11 is essentially the FIG. 10 view, but reduced in size and amplified with dimensional and angular information, of the inventive embodiment shown in FIG. 5 and of a gasket channel such as shown in FIG. 2.

Particularly with reference to FIG. 9 through FIG. 11, the inventive device is typically embodied for purposes of facilitating insertion of an elongate generally rectangular-profiled gasket in a generally rectangular-profiled channel. As illustrated in FIG. 9, gasket 100 has two right-angled corner areas 103 that each match the L-interior right angle $r_{IN}$ of L-profiled prismatic section 320. Inventive device 100 is manually used to insert gasket 50 into channel 61. A person grasps handle 200 and manipulatively applies pressure to gasket 50 via head 300 whereby a right-angled corner area 103 of gasket 50 fits inside L-interior right angle $r_{IN}$.

Many closure gasket channels are characterized by two channel projections/protrusions that narrow the access opening into the channel. The projections/protrusions frequently are projecting/protruding lip-like formations separated from and pointing toward each other on opposite sides of and along the length of the channel, thereby partially closing the channel. FIG. 2, FIG. 9, FIG. 10, FIG. 11, and FIG. 13 are each illustrative, by way of example, of a channel 60 having two protrusions 63 and 64.

FIG. 10 depicts use of inventive device 100 such as may follow the use of inventive device 100 that is depicted in FIG. 9. It can be conceived that gasket 50 is mostly but not entirely set in the interior 66 of gasket channel 61. The user continues to grasp handle 200 and to manipulatively apply pressure to (e.g., tamp down) gasket 50 via head 300, particularly via second generally planar segment 322 (which is shorter than first generally planar segment 321). As shown in FIG. 10, the user can avail himself/herself of, for leverage, either protrusion 63, or protrusion 64, or, consecutively and/or concurrently, both protrusion 63 and protrusion 64.

Head 300 is shown in FIG. 10 to be in contact, in the vicinity of either or both of said first L-exterior right angle $r_{EX1}$ and said second L-exterior right angle $r_{EX2}$, with either or both of channel protrusion 63 and channel protrusion 64; more specifically, first L-exterior segment surface 324 is shown to be contiguous to protrusion 63, and second L-exterior segment surface 326 is shown to be contiguous to protrusion 64. A "rocking" motion can be performed by the user whereby the user moves handle 200 rotatively in a geometric plane in which handle 200 lies, primarily doing so bidirectionally perpendicular to prismatic longitudinal direction $h_D$, or, equivalently expressed, bidirectionally perpendicular to the length of channel 60.

Angular deviations from perpendicularity with respect to the length of channel 60 may be taken by the user in rotatively moving handle 200 back and forth so as to "finesse" gasket 50 into a fully set position inside channel 60. Inventive manipulations same as or similar to those described herein and shown in FIG. 9 through FIG. 11 may be practiced throughout the entire length of channel 60, that is, not only along the straight regions of channel 60, but also along the curved regions (e.g., corners 67 shown in FIG. 3 and FIG. 4) of channel 60.

Figure 13:
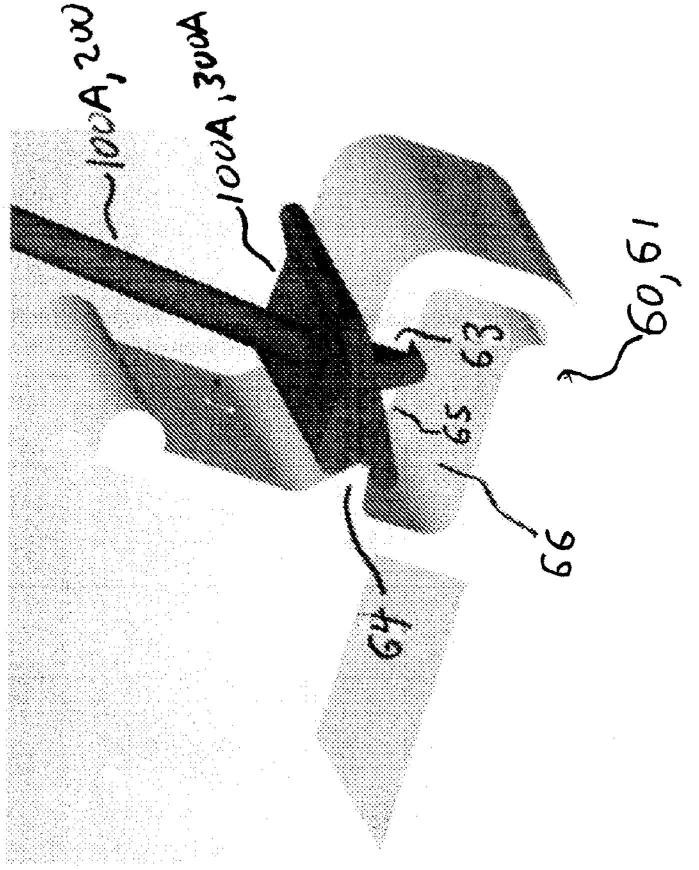
FIG. 13 is a view, similar to the FIG. 12 view, of the inventive embodiment shown in FIG. 12 and of a gasket channel such as shown in FIG. 2.
Figure 12:
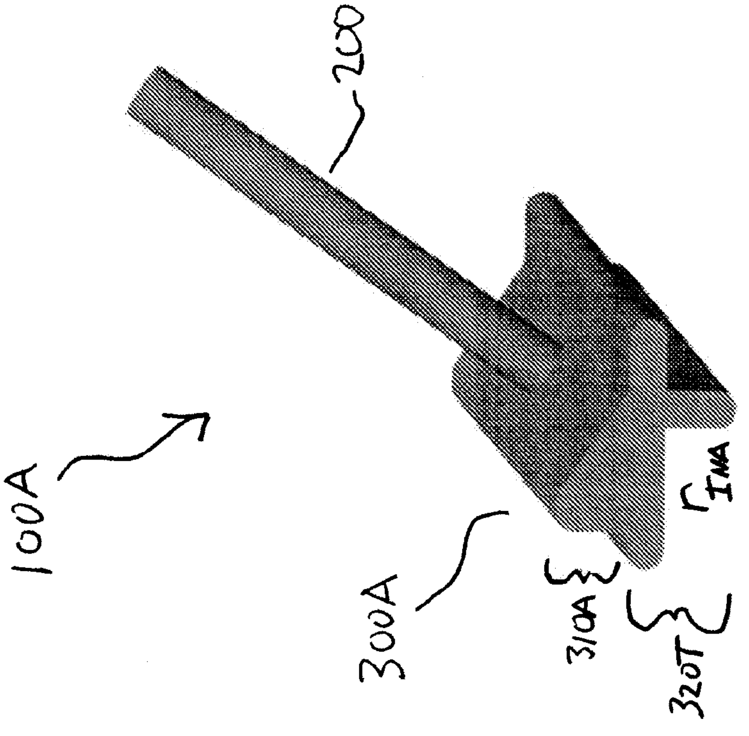
FIG. 12 is a perspective view of another embodiment of a gasket installation device in accordance with the present invention.

Now referring to FIG. 12 and FIG. 13, inventive insertion device 100A includes straight handle (e.g., a rod or a shaft) 200 and head 300A. Inventive device 100A's head 300A, shown in FIG. 12 and FIG. 13, is characterized by a geometry that significantly differs from that of inventive device 100's head 300, shown in FIG. 5 through FIG. 11. Handle 200 has a geometric longitudinal axis a, an attached end 201, and an unattached end 202. Head 300A includes a trianguloid-profiled prismatic section 310A and a T-profiled prismatic section 320T. Handle 200 is perpendicularly and centrally attached at its end 201 to trianguloid-profiled prismatic section 310A.

Note that T-profiled prismatic section 320T of inventive device embodiment 100A is analogous, in both structure and function, to L-profiled prismatic section 320 of inventive device embodiment 100. Of particular note, inventive device 100A's T-profiled prismatic section 320T describes T-interior right angle $r_{INA}$, similarly as inventive device 100's L-profiled prismatic section 320 describes L-interior right angle $r_{IN}$. Although the present inventors in their inventive testing found inventive device 100 to be preferable in general to inventive device 100A, inventive device 100A also offers beneficial usefulness, handheld implementation thereof being similar to that of inventive device 100. In particular, a user of inventive device 100A can utilize the interior right-angled surfaces of T-interior right angle $r_{INA}$ to conformingly contain and control a gasket 50, similarly as a user of inventive device 100 can utilize the interior right-angled surfaces of L-interior right angle $r_{IN}$ to conformingly contain and control a gasket 50.

The present invention, which is disclosed herein, is not to be limited by the embodiments described or illustrated herein, which are given by way of example and not of limitation. Other embodiments of the present invention will be apparent to those skilled in the art from consideration of the instant disclosure or from practice of the present invention. Various omissions, modifications, and changes to the principles disclosed herein may be made by one skilled in the art without departing from the true scope and spirit of the present invention, which is indicated by the following claims.

What is claimed is:

1. An insertion device comprising a head and a handle, wherein:

said head includes a right-trianguloid-profiled section and an L-profiled section;

said right-trianguloid-profiled section has a hypotenuse surface;

said handle is characterized by a handle axis and is connected to said head at said hypotenuse surface, said handle axis being approximately perpendicular to said hypotenuse surface;

said L-profiled section has a first interior surface and a second interior surface;

a right angle is formed by said first interior surface and said second interior surface and is characterized by a bisector, said bisector being approximately parallel to said handle axis and approximately perpendicular to said hypotenuse surface.

2. The insertion device of claim 1, wherein said handle is a rod or a shaft, and wherein the device is manually useable for inserting a generally rectangular-profiled gasket into a generally rectangular-profiled channel, wherein use of the insertion device includes holding said handle while applying force to said gasket via said head whereby said head grasps said generally rectangular-profiled gasket conformingly inside said right angle.

3. The insertion device of claim 2, wherein said handle has two handle ends and is connected to said head at one said handle end, and wherein said generally rectangular-profiled channel is configured so as to be partially closed by a pair of lips protruding along and on opposite sides of said generally rectangular-profiled channel, and wherein use of the insertion device includes holding said handle while applying force to said gasket via said head whereby said L-profiled section engages either or both of said lips for leverage.

4. The insertion device of claim 1, wherein:

said right angle is a first right angle;

said bisector is a first bisector;

said trianguloid-profiled section has said hypotenuse surface, a first non-hypotenuse surface, and a second non-hypotenuse surface;

said L-profiled section has said first interior surface, said second interior surface, a first exterior surface, and a second exterior surface;

a second right angle is formed by said first exterior surface and said first non-hypotenuse surface and is characterized by a second bisector, said second bisector being approximately perpendular to said handle axis, approximately perpendicular to said first bisector, and approximately parallel to said hypotenuse surface;

a third right angle is formed by said second exterior surface and said second non-hypotenuse surface and is characterized by a third bisector, said third bisector being approximately perpendular to said handle axis, approximately perpendicular to said first bisector, approximately parallel to said hypotenuse surface, and approximately parallel to said second bisector.

5. The insertion device of claim 4, wherein the geometric plane in which said first exterior surface lies, and the geometric plane in which said second non-hypotenuse surface lies, are approximately coincident.

6. The insertion device of claim 4, wherein said second right angle and said third right angle face in generally opposite directions.

7. The insertion device of claim 4, wherein said handle is a rod or a shaft, and wherein the device is manually useable for inserting a generally rectangular-profiled gasket into a generally rectangular-profiled channel, wherein use of the insertion device includes holding said handle while applying force to said gasket via said head whereby said head grasps said generally rectangular-profiled gasket conformingly inside said right angle.

8. The insertion device of claim 7, wherein said handle has two handle ends and is connected to said head at one said handle end, and wherein said generally rectangular-profiled channel is configured so as to be partially closed by a pair of lips protruding along and on opposite sides of said generally rectangular-profiled channel, and wherein use of the insertion device includes holding said handle while applying force to said gasket via said head whereby said L-profiled section engages either or both of said lips for leverage.

9. A hand-operated device comprising:

a substantially straight handle characterized by a geometric axis; and a head including a trunk, a substantially straight longer branch, and a substantially straight shorter branch;

said trunk having a first trunk surface, a second trunk surface, and a third trunk surface;

said longer branch having a first longer branch surface and a second longer branch surface;

said shorter branch having a first shorter branch surface and a second shorter branch surface;

said first longer branch surface and said first trunk surface defining therebetween a first right angle, wherein a geometric bisector of said first right angle is approximately perpendicular to said geometric axis;

said first shorter branch surface and said second trunk surface defining therebetween a second right angle, wherein a geometric bisector of said second right angle is approximately perpendicular to said geometric axis and is approximately parallel to the geometric bisector of said first right angle;

said second longer branch surface and said second shorter branch surface defining therebetween a third right angle, wherein a geometric bisector of said third right angle is approximately parallel to said geometric axis;

said handle being connected to said trunk at said third trunk surface, wherein said geometric axis is approximately perpendicular to said third trunk surface.

10. The hand-operated device of claim 9 wherein said first longer branch surface and said second trunk surface are approximately coplanar.

11. The hand-operated device of claim 9 wherein said handle is a rod or a shaft, and wherein the hand-operated device is for inserting an elongate generally rectangular-profiled gasket into a generally rectangular-profiled channel, and wherein said insertion of said gasket into said channel includes holding said handle and forcefully controlling said gasket via said head whereby said gasket fits inside said third right angle.

12. The hand-operated device of claim 11 wherein said handle has two handle ends and is connected to said head at one said handle end, and wherein said channel has a first projection and a second projection distanced from and pointing generally toward each other so as to partially close said channel, and wherein said insertion of said gasket into said channel includes utilizing at least one said projection for leverage whereby said projection contacts either said first longer branch surface or said first shorter branch surface.

13. The hand-operated device of claim 12 wherein said handle is unconnected at the other said handle end, and wherein said grasping of said handle includes rotating said handle about said head in a geometric plane in which said geometric axis lies and in one or more directions toward either or both of said first projection and said second projection.

14. A device suitable for facilitating installation of a gasket, the device comprising a handle and a head, said head including a trianguloid-profiled prismatic section and an L-profiled prismatic section, said trianguloid-profiled prismatic section having a longitudinal attachment surface to which said handle is approximately perpendicularly and approximately centrally attached at one end of said handle, said L-profiled prismatic section including two generally planar segments, said two generally planar segments being a first generally planar segment and a second generally planar segment, said first generally planar segment having a longitudinal first L-interior segment surface, said second generally planar segment having a longitudinal second L-interior segment surface, said first L-interior segment surface and said second L-interior segment surface forming an L-interior right angle that faces generally opposite said attachment surface and whose bisector is approximately parallel to said handle and approximately perpendicular to said attachment surface.

15. The device of claim 14 wherein said trianguloid-profiled prismatic section and said L-profiled prismatic section are characterized by approximately the same longitudinal expanse.

16. The device of claim 14, wherein:

said trianguloid-profiled prismatic section has a longitudinal first non-attachment surface and a longitudinal second non-attachment surface;

said first generally planar segment has a longitudinal first L-exterior segment surface;

said second generally planar segment has a longitudinal second L-exterior segment surface;

said first non-attachment surface and said first L-exterior segment surface form a first L-exterior right angle;

said second non-attachment surface and said second L-exterior segment surface form a second L-exterior right angle.

17. The device of claim 16, wherein said trianguloid-profiled prismatic section and said L-profiled prismatic section are joined along approximately the same prismatic longitudinal direction, and wherein said second non-attachment surface and said first L-exterior segment surface face in generally opposite directions and are approximately coplanar.

18. The device of claim 14 wherein said handle is a rod or a shaft, and wherein the device is suitable for facilitating insertion of an elongate generally rectangular-profiled gasket in a generally rectangular-profiled channel, wherein said gasket has a right-angled corner portion that matches said right angle, and wherein said insertion of said gasket into said channel includes manual use of the device whereby a person grasps said handle and applies pressure to said gasket via said head whereby said right-angled corner portion fits inside said right angle.

19. The device of claim 18, wherein said handle is unattached at the other end of said handle, and wherein said channel has a first projection and a second projection distanced from and pointing generally toward each other so as to partially close said channel, and wherein said insertion of said gasket into said channel includes manual use of the device whereby said person grasps said handle and applies pressure to said gasket via said head while said head, in the vicinity of either or both of said first L-exterior right angle and said second L-exterior right angle, is in contact with either or both of said first projection and said second projection.

20. The device of claim 18, wherein said handle is unattached at the other end of said handle, wherein said channel is characterized by a channel length, and wherein said insertion of said gasket into said channel includes manual use of the device whereby said person, while applying pressure to said gasket, moves said handle approximately rotatively and approximately bidirectionally in a geometric plane in which said handle approximately lies that is approximately perpendicular to said channel length.

* * * * *